United States Patent [19]
Olink et al.

[11] 4,066,815
[45] Jan. 3, 1978

[54] GLAZING FOR TRANSMITTING SOLAR RADIATION

[75] Inventors: Jan Olink, Bois-Colombes, France; Jacques Dela Ruye, Montigny-le-Tilleul, Belgium

[73] Assignee: BFG Glassgroup, Paris, France

[21] Appl. No.: 703,221

[22] Filed: July 7, 1976

[30] Foreign Application Priority Data

July 8, 1975 France .................................. 75.72932

[51] Int. Cl.$^2$ .......................................... B32B 17/06
[52] U.S. Cl. ....................................... 428/336; 52/171; 427/162; 427/165; 428/432
[58] Field of Search .................. 428/34, 426, 432, 336; 427/161–169; 52/171, 172, 304

[56] References Cited

U.S. PATENT DOCUMENTS

| | | | |
|---|---|---|---|
| 3,473,944 | 10/1969 | Dates | 428/432 X |
| 3,531,313 | 9/1970 | Dates | 428/432 X |
| 3,694,299 | 9/1972 | Wagner | 428/432 X |
| 3,850,665 | 11/1974 | Plumat et al. | 428/432 |
| 3,935,351 | 1/1976 | Franz | 428/34 |
| 3,953,110 | 4/1976 | Charoudi | 428/34 X |
| 3,959,565 | 5/1976 | Jordan et al. | 428/432 |

*Primary Examiner*—Thomas J. Herbert, Jr.
*Assistant Examiner*—Bruce H. Hess
*Attorney, Agent, or Firm*—Spencer & Kaye

[57] ABSTRACT

A glazing unit permitting collection of an increased amount of incident solar energy and composed of a substrate of a composition such that its total solar radiation energy transmittance is greater than that of a similarly dimensioned substrate of ordinary soda-lime glass, and a coating at least partially covering at least one face of the substrate and being at least partially reflective of infrared radiation having a wavelength greater than 3μ.

18 Claims, 2 Drawing Figures

GLAZING FOR TRANSMITTING SOLAR RADIATION

BACKGROUND OF THE INVENTION

The present invention relates to glazing units, and in particular to glazing units for forming the walls of enclosures for accumulating solar energy.

Systems for accumulating and using solar energy, such as solar cells, are generally provided with a glazed wall through which incident solar energy penetrates and where it is retained.

Up to the present, such glazed walls have been formed from industrial soda-lime glass of ordinary composition, such as drawn or float glass.

It has been found that when using such glass, a part of the incident solar energy is not used and that, as a consequence, the solar energy accumulator is not as efficacious as it could be.

SUMMARY OF THE INVENTION

It is therefore an object of the present invention to provide a glazing unit which will afford an increase in the amount of incident solar energy which can be controlled by an accumulator enclosed or covered by such a unit.

This and other objects according to the present invention are achieved by the provision of a glazing unit composed of a substrate whose total energy transmittance for solar radiation is greater than that of a similarly dimensioned substrate of ordinary soda-lime glass, with at least one face of the substrate being at least partially covered with a coating which transmits solar radiation and at least partially reflects infrared radiation having a wavelength greater than $3\mu$.

Such glazing units have been found to afford several significant advantages.

If the energy accumulated at a given location behind such a glazing unit is measured, for example, using an energy absorbing element, it is found that the amount of energy which is accumulated there is increased in a manner which is more than directly proportional to the energy transmitted by the glazing unit. There is an augmented greenhouse effect.

It therefore becomes possible to accumulate solar energy in a viable way not only during periods of high intensity solar radiation, but also to accumulate and use solar energy in an efficacious manner even when the intensity of the incident solar radiation is relatively weak. For example, when the temperature difference between an energy absorbing surface in a solar energy accumulator and the atmosphere is 25° C and the incident solar energy flux is less than 200 W/m² use of a glazing unit according to the present invention makes it possible to accumulate and make use of as much energy as would be the case when using an ordinary soda-lime glass sheet under the same conditions but with an incident energy flux of 400 W/m².

As a result of this, it is possible to dispense with auxiliary energy sources which are sometimes used, or at least to reduce the amount of energy taken from such an auxiliary source.

Glazing units according to the invention also allow the accumulation of solar energy during longer periods of the day, and this is particularly important in the case of countries where the solar energy flux is not very high.

For a given solar energy accumulator and a constant incident solar energy flux, the efficiency of the accumulator is found to diminish as the difference between the temperatures of the accumulator and of surrounding air increases. It has been found that by using a glazing unit in accordance with the present invention this diminution is not as great as it is with the same accumulator associated with an ordinary soda-lime glass sheet.

In a similar way, if that temperature difference remains constant and only the incident solar energy flux diminishes, there will also be a reduction in the efficiency of a given accumulator. Again, by replacing an ordinary soda-lime glass sheet with a glazing unit according to the invention, this reduction in efficiency is lessened.

Preferably, the coating provided on the substrate has a reflectivity of at least 0.5 for infrared radiation having wavelengths greater than $3\mu$. This increases the efficacy of a glazing unit for the purposes in view by reducing the heat loss by radiation from an enclosure of which it forms a wall or wall portion.

Advantageously, the coated substrate has a total energy transmittance for solar radiation which is at least 80% of, and optimally at least equal to, that of the substrate of ordinary soda-lime glass. These features have the effect of increasing the efficacy of a glazing unit by increasing the incident solar energy which is transmitted.

The substrate can be constituted by various materials and can, for example, be composed of a sheet of plastic material. Preferably, however, the substrate is composed of at least one vitreous sheet, since such substrates are convenient to use and easy to fit into place.

Such a vitreous sheet may be of a special composition, for example, of a glass having high transmittance for the infrared portion of the solar spectrum, but it is not always necessary to use special glass, and it is in fact preferred that the or at least one vitreous sheet of the glazing unit should be of soda-lime glass, that is to say a glass whose composition is based on soda, lime and silica. It has been found that even when using soda-lime glass containing approximately 68% to 74% $SiO_2$, 12% to 16% $Na_2O$ and 7% to 14% CaO (proportions by weight), which in fact corresponds to the proportions currently used for the production of most industrial glass, it is possible by modifying the minor constituents thereof, to achieve a total energy transmittance for solar radiation which is greater than that of ordinary soda-lime glass.

There are various ways in which the required transmittance can be achieved, and one way is to reduce the amount of iron in the glass. Iron is nearly always present due to impurities. This reduction or removal of iron, however, can be expensive, and accordingly it is preferred to reduce the amount of divalent, as opposed to trivalent, iron in the glass, since the presence of ferric oxide in the glass does not have as deleterious an effect on its infrared transmittance as does the presence of ferrous oxide. One way in which this can be accomplished is by simply controlling the glass melting conditions. Another way is to mix various additives into the vitrifiable batch, such as, for example, $NaNO_3$, $As_2O_3$, $Sb_2O_3$ and/or selenium.

A particularly economical, and therefore especially preferred, way of ensuring that a large proportion of any iron present in the glass is in trivalent form is by ensuring that the glass includes manganese oxide and/or cerium oxide. It is best to use only small quantities of these oxides, and preferably the total weight of manganese oxide and/or cerium oxide is between 0.01% and 1.0% of the weight of the glass.

Advantageously, soda-lime glass forming the substrate contains between 0.01% and 0.5% by weight of manganese oxide, calculated in the form $MnO_2$. Such substrates can be particularly inexpensive and yet have satisfactory optical and energy transmitting properties for the purpose in view, and these properties are well conserved during the course of time.

Preferably, substantially all iron oxide present, if any, is ferric oxide, and it is especially suitable to make use of soda-lime glass containing less than 0.12% by weight of ferric oxide e.g. between 0.03% and 0.12%. With such low quantities of ferric oxide it is possible to attain a high total energy transmittance without having recourse to more costly materials.

A particularly useful glass for forming such a substrate contains, by weight 0.27% $MnO_2$, 0.1% $Fe_2O_3$; and 0.06% $CeO_2$. Such a substrate is not tinted and can afford a particularly high total energy transmittance with respect to solar radiation.

When a vitreous sheet is used in the glazing unit, especially a soda-lime glass sheet, its mechanical strength can be augmented without modification of its optical and energy transmitting properties, and it is accordingly preferred to use glass which has been chemically tempered. This yields particular advantages when it is necessary to place the glass in a position where it is likely to be subjected to mechanical stresses.

The invention requires the use of a reflecting coating which transmits solar radiation and at least partially reflects infrared radiation having wavelengths greater than $3\mu$. By a judicious disposition of such a coating it is possible to make use of a very high proportion of incident solar radiation, while at the same time reducing heat loss, e.g. from a solar energy receiving surface located behind the glazing unit, both by convection and radiation. Preferably, such coating is transparent to visible light so that vision through the glazing unit is not impeded and natural illumination of the space behind it is permitted.

In order to make maximum use of incident solar radiation, it is advantageous for the infrared reflecting coating to be transparent to substantially all wavelengths within the solar spectrum.

For example, a 5000A thick coating of $SnO_2$ may not transmit more than about 10% of incident energy at wavelengths above $2\mu$. It should, however, be noted that the proportion of solar energy which is radiated at these wavelengths is very small and, accordingly, this is not considered to be important.

Preferably the infrared reflecting coating is constituted by at least one layer of metal oxide. Such coatings can be formed by simply using known techniques and inexpensive reagents. Coatings composed of tin oxide, lead oxide and indium oxide, whether alone or as mixtures, are preferred. The use of such a coating composed of tin oxide is particularly advantageous since it is transparent to solar radiation, is hard and is chemically and mechanically durable so that no problems are encountered if the coating is directly exposed to the atmosphere.

Preferably, such an oxide layer contains small quantities of one or more of antimony oxide, arsenic oxide, cadmium oxide, tellurium oxide, fluorine ions and chlorine ions. The use of these so-called doping agents increases the effectiveness of the coating as an infrared radiation reflector.

The thickness of the coating should be chosen so as to give maximum effectiveness, and this will be a compromise between maximum reflection of far infrared radiation and minimum absorption of solar radiation. For a given substrate, as the coating thickness increases, so will infrared reflection ans solar radiation absorption. The optimum thickness of a metal oxide coating has been found to lie between 500A and 5,500A.

Glazing units according to the present invention are particularly suitable for location in a wall of a solar energy accumulator. The expression "solar energy accumulator" is used in this specification in a broad sense, and includes, for example, greenhouses and solar cells for the direct conversion of solar radiation into electricity, as well as other solar energy converters such as systems for heating water or other fluid by solar radiation to supply a hot water or thermal conditioning system for a dwelling or other building.

Such solar energy converters generally include an enclosure of some sort and one or more walls of this enclosure are glazed to allow solar radiation to penetrate and to prevent as much energy as possible from leaving, and glazing units according to the present invention are particularly suitable for this purpose, especially when the infrared reflecting coating is on a face of the substrate which is directed towards the solar energy receiving surface of the converter, as is preferred.

Heat loss from an enclosure bounded by a glazing unit can take place by radiation through and from the glazing unit, and also by convection and conduction through the glazing unit to the surrounding atmosphere. As has bene explained above, glazing units according to the invention are mainly intended to reduce heat loss by radiation. In order further to reduce heat transfer through a glazing unit according to the invention which is located in an enclosure wall, that wall and/or unit may be provided with a plurality of projections on its exterior which are arranged to serve as wind breaks for the glazed area, and these will have the effect of reducing the rate at which fresh, cooler air contacts the glazing unit. If, as is preferred, these wind breaks are constituted as light transmitting projections, they will not shade the glazing unit. A very simple way of providing such projections is to make the glazing unit using figured, or shaped, glass. Alternatively, or in addition, baffles standing up from the wall may be provided. For best results, such projections should be made of the same material as the substrate of the glazing unit.

By making use of glazing units according to the invention, it has been found that the thermal efficiency of solar energy converters can be significantly improved.

The thermal efficiency of a solar energy converter ($\eta$) can be expressed according to the relation: $\eta = a - c \Delta T/E$ where $\Delta T$ is the temperature difference between the solar energy receiving surface (or collector) and the surrounding atmosphere; E is the incident solar energy flux; $a$ and $c$ are constants characterizing the converter. $a$ is in fact the ratio of solar energy flux directly absorbed by the collector, its value subtantially depends from the total energy transmission of the glazed cover and the absorption coefficient of the collector. $c$ is the total thermal resistance including heat losses by radiation, conduction and convection.

As an indication of the results which can be achieved, the following table shows results produced by a solar energy converter having a collector equipped with a black energy receiving surface, at an incident solar energy flux of 400 W/m² and a temperature difference of 25° C between the collector and the surrounding atmosphere. The energy receiving surface was surmounted in sequence by three glazing units. Unit A was an ordinary sheet of industrial soda-lime glass, Unit B was a sheet of soda-lime glass of the same thickness in which substantially all the iron was in trivalent form, and Unit C consisted of a sheet of glass similar to that of Unit B and having a tin oxide based coating on the side directed towards the collector.

|  | Total energy transmission | Efficiency |
| --- | --- | --- |
| Unit A | 82% | 42% |
| Unit B | 92% | 51% |
| Unit C | 86% | 64% |

The use of a glazing unit according to the invention in a solar energy converter also has the advantage of increasing efficiency at low intensities, at which the performance of conventional solar energy converters has been very poor, and this allows longer use during the day and use on more days during the year. This is very important in countries which do not receive high intensities of radiation from the sun. By way of illustration, for an incident radiation energy flux of 150 W/m² and a difference in temperature between a collector and the ambient atmosphere of 25° C, a black collector surmounted by a conventional glass sheet will rarely have an efficiency greater than 20%, whereas using the same type of collector and a glazing unit according to the invention, the efficiency will be greater than 30%.

Consider an incident solar energy flux of 500 W/m², which is quite a good intensity for the operation of a solar energy converter, and a temperature difference between the energy receiving element, that is, the collector, and the air of 50° C. By replacing an ordinary soda-lime glass sheet with a glazing unit according to the invention, the total energy transmitted through to the collector can be increased by 5%, but the improvement in efficiency afforded can exceed 150%. If an ordinary soda-lime glass sheet with a far infrared reflecting coating is replaced by a glazing unit according to the invention, the efficiency can be increased by 25% while the total energy transmitted to the collector element is only 13% more. These results were obtained using a black collector element, but it will be appreciated that they can also be obtained using a selective energy receiving element.

In certain embodiments of the invention, the glazing unit is composed of more than one sheet, e.g. it may be a double glazing unit. In such cases it is best for the infrared reflecting coating to be formed on that exterior face of the unit which faces into the solar energy converter. Even if only one sheet of such a multi-sheet panel has a greater total energy transmittance for solar radiation than does an ordinary soda-lime sheet, some advantage will accrue over a similarly dimensioned multi-ply panel formed entirely of ordinary soda-lime glass, but it is of course preferred that each sheet of a multi-ply panel unit according to the invention have the specified higher transmittance.

It has been found that for low intensity incident solar radiation, a multi-sheet panel unit gives an increased efficiency compared with a single sheet of the same glass composition and having the same coating, but that as the intensity rises this advantage will diminish and can disappear.

BRIEF DESCRIPTION OF THE DRAWINGS

Various preferred embodiments of the invention will now be described by way of example and with reference to the accompanying diagrammatic drawings in which.

DESCRIPTION OF THE PREFERRED EMBODIMENTS

Figure 1:
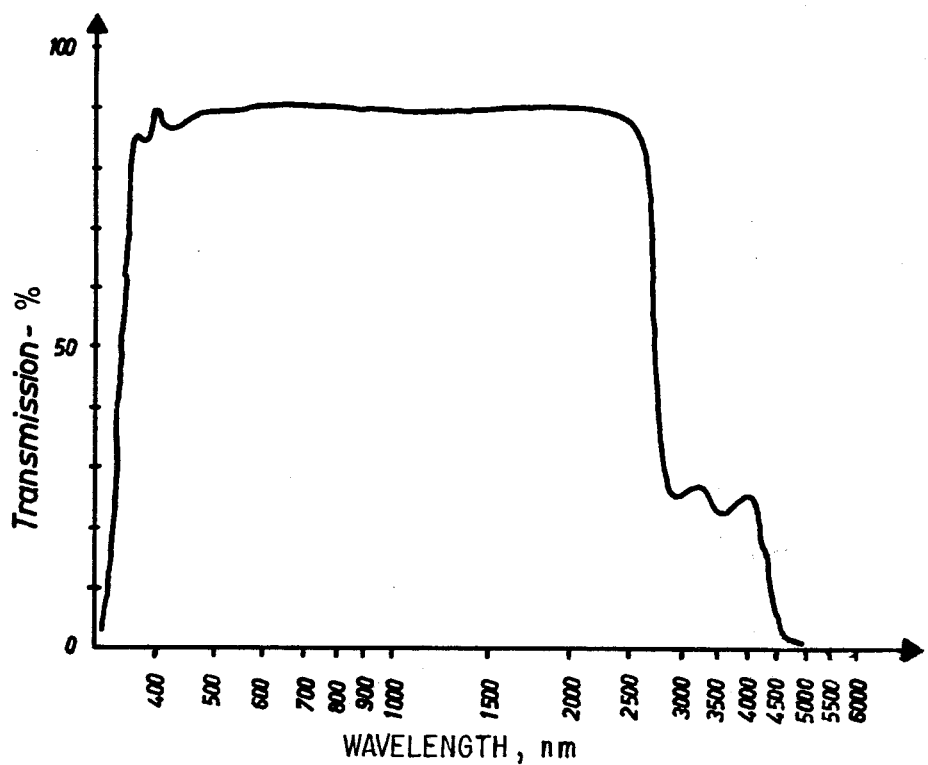
FIG. 1 is a graph showing the proportions of radiant energy of various wavelengths which are transmitted by a substrate of a glazing unit according to the invention.

FIG. 1 shows the relationship between energy transmittance and wavelength for a glass sheet 3mm in thickness and having the following composition by weight:

| $SiO_2$ | between | 68% | and | 74% |
| --- | --- | --- | --- | --- |
| $Na_2O$ | between | 12% | and | 16% |
| $CaO$ | between | 7% | and | 14% |
| $Fe_2O_3$ | less than | 0.12% | | |
| $CeO_2 + MnO_2$ | between | 0.01% | and | 1%. |

It will be noted that at all wavelengths between 400 nm and 2500 nm, the glass transmits approximately 90% of the incident radiation. In fact only a small proportion of energy is dissipated by the sun at wavelengths greater than 2000 nm.

Figure 2:
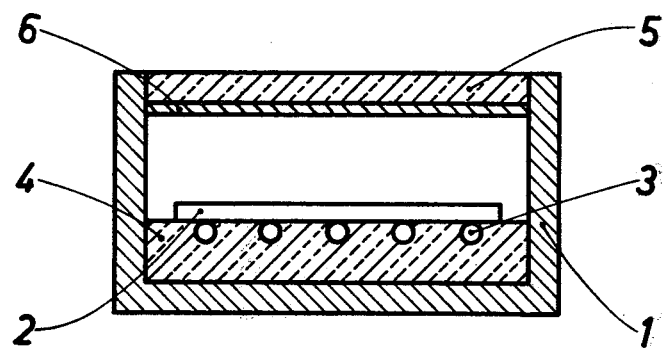
FIG. 2 is a cross-sectional view of one embodiment of a glazing unit according to the invention incorporated in a solar energy converter.

FIG. 2 shows a solar energy converter for the heating of water or other fluid by solar radiation. The converter is composed of an enclosure having walls 1 which surround a flat collector 2. The collector 2 is formed of a blackened material which provides an energy collecting surface in thermal contact with a system of tubes 3 through which fluid, e.g. water, can circulate for heating by the energy absorbed by the collector. The collector and associated tubes are thermally insulated from the exterior of the enclosure by conventional insulating material 4 such as glass fiber. A glazing unit is fixed to the walls of the enclosure by means not shown to cover the collector. The glazing unit includes a sheet of glass 5 which carries a coating 6 on the side facing the collector, the coating serving to reflect infrared radiation emitted by the collector.

EXAMPLE 1

A sheet of glass 3mm thick was cut from a ribbon made by a conventional drawing process, such as the Pittsburgh or Libbey-Owens process.

The glass had the following composition expressed as percentages by weight of oxide:

| $SiO_2$ | 72.50 % |
| --- | --- |
| $Na_2O + K_2O$ | 13.90 % |
| $CaO$ | 7.42 % |
| $MgO$ | 4.00 % |
| $Al_2O_3$ | 1.75 % |
| $Fe_2O_3$ | 0.10 % |
| $MnO_2$ | 0.27 % |
| $CeO_2$ | 0.06 % |

In this glass, the iron present is substantially all in trivalent form.

The total energy transmittance of this glass sheet for solar radiation is approximately 90%, whereas that of a sheet of a soda-lime glass of similar composition having the same thickness but not containing cerium oxide or manganese oxide is 86%.

On one surface of the highly transmitting glass sheet there was formed an infrared reflecting coating consisting principally of $SnO_2$ and containing small quantities of fluorine ions. Such a coating can be formed in the known manner by pyrolysis of tin chloride and ammonium fluoride. The coating was deposited to a thickness of 400 A. The coating had a good transmittance in the visible spectrum and in the near infrared, and a reflectivity with respect to radiation of wavelengths greater than $3\mu$ of approximately 0.7. The total energy transmittance of the coated glass is approximately 84%.

Sheets of glass coated in this way to form glazing units according to the invention were placed in a greenhouse with their coated faces on the outside in direct contact with the atmosphere.

In this was it was found that there was a considerable reduction in the heat lost by radiation towards the sky, and the beneficial result of this was particularly apparent in winter with a clear sky. Also the amount of solar energy which could penetrate and be retained by the greenhouse was much higher than with a conventional greenhouse which only used sheets of ordinary glass. The increase in the use of solar energy afforded by using coated glass sheets as aforesaid permits economies in greenhouse heating. It has been found that such economies are appreciable even in dull and overcast weather. Such greenhouse heating economies afforded by the use of glazing units according to the present invention are observed even in countries in which, during the course of the year, solar radiation is not very intense.

In a similar fashion, it is possible to reduce the consumption of fuel for heating purposes by placing units according to the invention to act as windows of buildings. A particularly interesting use of such glazing units is in the field of solar heating systems for buildings.

Even better results, that is a greater reduction in heating costs, can be obtained by replacing the glass substrate described above with a glass containing not more than 0.03% by weight $Fe_2O_3$ and 0.2% by weight $MnO_2$.

EXAMPLE 2

A sheet of glass was cut from a 3mm thick ribbon drawn in a conventional glass drawing process. The glass had the following composition by weight expressed as percentages by weight of oxides:

| | | |
|---|---|---|
| $SiO_2$ | 72.3 | % |
| $Na_2O + K_2O$ | 14.5 | % |
| $CaO$ | 7.01 | % |
| $MgO$ | 4. | % |
| $Al_2O_3$ | 1.3 | % |
| $Fe_2O_3$ | 0.10 | % |
| $MnO_2$ | 0.51 | % |
| $CeO_2$ | 0.20 | % |

In this glass the iron content is essentially in trivalent form.

The total energy transmittance of this glass for solar radiation is superior to that of a similar soda-lime glass not containing $MnO_2$ or $CeO_2$. The glass has a very slight rose-violet coloration, similar to amethyst.

The total energy transmittance of the glass was 88% whereas that of a sheet of ordinary soda-lime glass of the same thickness is 86%.

An infrared reflecting coating of $SnO_2$ was deposited on the sheet as described in Example 1. The total energy transmittance of the coated sheet is approximately 82%.

This coated sheet was located in a solar energy converter as shown in FIG. 2 with the infrared reflecting coating directed towards the energy receiving surface of the collector.

The efficiency of this converter with a black collector and a temperature difference between the collector and the ambient atmosphere of 25° C was of the order of 60% for an incident solar energy flux of 400 W/m², whereas with a similar collector covered by an ordinary soda-lime glass sheet of the same dimensions, the efficiency is only about 45%.

EXAMPLE 3

A sheet of glass of the composition first given in Example 1 and 5mm thick was formed and was found to transmit 89% of incident solar radiation energy. The sheet was given a coating consisting principally of $SnO_2$ doped with fluorine ions. Such a coating was obtained using known techniques by thermal decomposition of $SnCl_4$ and $NH_4F.HF$.

Such a coating deposited to a thickness of 3500 A has an excellent transmittance with respect to visible light and near infrared, and a reflectivity with respect to longer wavelength infrared radiation of 0.75.

The coated sheet was placed in a solar energy converter as shown in FIG. 2, with its coated face directed towards the collector which had a black energy receiving surface.

The efficiency of this converter was measured and compared with the efficiency of the same converter in which the glazing unit according to the invention was replaced by an ordinary soda-lime glass sheet of the same dimensions.

The results are given in the following table in which
Column 1 gives the efficiency for an incident energy flux of 400 W/m² and a temperature difference between the collector and the atmosphere of 25° C,
Column 2 gives the efficiency for an incident energy flux of 800 W/m² and a temperature difference between the collector and atmosphere of 25° C,
Column 3 gives the efficiency for an incident energy flux of 400 W/m² and a temperature difference between the collector and the atmosphere of 50° C,
Column 4 gives the efficiency for an incident energy flux of 800 W/m² and a temperature difference between the collector and the atmosphere of 50° C, and
Column 5 gives the total energy transmittance of the glazing unit for solar radiation.

The coating referred to is that specified earlier in this

| Example. | 1 | 2 | 3 | 4 | 5 |
|---|---|---|---|---|---|
| Coated glass according to Example 3 | 61% | 71% | 36% | 58% | 83% |
| Ordinary soda-lime glass | 42% | 61% | 3% | 40% | 82% |
| Coated ordinary soda-lime glass | 54% | 64% | 29% | 51% | 76% |

It was found that the gain in efficiency of the solar energy converter was more than proportional to the increase in energy transmitted.

In a variant of this embodiment, the coated sheet of glass was surmounted by a second similar but uncoated sheet to form a double glazing unit according to the invention.

It was found that the efficiency of the converter was higher than with a simple sheet for weak incident radiation, but that for an incident energy flux of the order of 400 W/m² or more, the efficiency was lower than when using a single sheet glazing unit according to the invention. However, for a given temperature difference between the collector and atmosphere at no matter what value of incident energy flux, the efficiency of the converter incorporating this double glazing unit was always greater than that of a converter employing the same collector and a double glazing unit formed of ordinary soda-lime glass sheets.

EXAMPLE 4

A sheet of glass 1mm thick and of the composition given in Example 1 was coated with a layer of $SnO_2$ doped with antimony. The coating was 4000 A thick and was obtained in a known manner using a solution of $SnCl_2$ and $SbCl_3$.

The transmittance of this coating in the visible and near infrared regions is excellent and its reflectivity with respect to far infrared radiation is high.

Such a sheet of glass, in the absence of the coating, will transmit 92% of the total energy of incident solar radiation as compared with approximately 90% for an ordinary soda-lime glass sheet of the same thickness. In the presence of the coating, the transmittance is approximately 86%.

The coated sheet was placed in a solar energy converter as shown in FIG. 2 with its coated side facing the collector which had a black energy receiving surface. For a temperature difference of 25° C between the collector and the atmosphere, and for an incident energy flux of 800 W/m², the efficiency of the converter was found to be of the order of 74%. By way of comparison, using a 1mm sheet of ordinary soda-lime glass in the same converter and under the same conditions, the efficiency was only 67%.

A similar result can be obtained by replacing the $SnO_2$ coating with a 2000 A thick coating of $In_2O_3$. This coating can be deposited in a known manner using a solution of $InCl_3$.

EXAMPLE 5

Sheets of glass 5mm thick were cut from a ribbon formed by drawing, in a conventional way, glass of the composition given in Example 1.

The sheets each had a total energy transmittance for solar radiation of 89% as compared with 82% for a sheet of ordinary soda-lime glass of the same thickness.

On one face of each sheet a coating of $SnO_2$ was formed as described in Example 1.

The sheets of glass covered with this coating were built into a greenhouse, the coated faces of the sheets being directed outwards and in contact with the ambient atmosphere.

It was found that the heat loss from the greenhouse by radiation towards the sky was reduced by an appreciable amount as compared with a similar greenhouse built with ordinary soda-lime glass, and that the amount of solar energy accumulated within the greenhouse was far greater.

One of the sheets carrying a coating of $SnO_2$, having a total energy transmittance of approximately 83%, was taken and used for a different purpose.

The sheet was placed in a solar energy converter as shown in FIG. 2. The sheet face carrying the coating of $SnO_2$ was directed towards the collector.

It was observed that with such a glazing unit, and with a temperature difference of 25° C between the collector and the atmosphere and an incident solar energy flux of 500 W/m², it was possible to attain an efficiency of the order of 65%. Under the same conditions but replacing the glazing unit according to the invention with a 5mm thick sheet of ordinary soda-lime glass, the efficiency was only about 50%. It was found that the efficiency could be increased still further by depositing, on the face of the glazing unit to be directed towards the sun, a thin anti-reflecting coating consisting principally of silica. This can be done in several ways, e.g. by decomposition of methyl silicate. The presence of this coating increases the total energy transmittance of the glazing unit.

EXAMPLE 6

Two 1mm thick sheets of glass of the composition given in Example 1 were assembled into a double glazing unit.

The total energy transmittance of one of such sheets for incident solar radiation is 92%, and that of the assembly of the two uncoated sheets would accordingly be 85%. The total energy transmittance of a similar unit composed of two 1mm sheets of ordinary soda-lime glass is only 81%.

An exterior face of this double glazing unit carried a coating of $SnO_2$ as described in Example 1, and the glazing unit was placed in a solar energy converter as shown in FIG. 2 with its coated face directed towards the collector which had a black energy receiving surface. The total energy transmittance of such a glazing unit is 79%.

The efficiency of the converter was of the order of 69% for an incident solar flux of 800 W/m² and a temperature difference of 25° C between the colllector and the ambient atmosphere. Under identical conditions save that the double glazing unit according to the invention was replaced by a unit composed of two 1mm thick sheets of ordinary soda-lime glass, the efficiency was only about 55%.

It was also found that the efficiency of the solar energy converter could be still further increased by depositing a thin anti-reflective coating of magnesium fluoride on the exterior face of the double glazing unit which was directed towards the sun.

It will be understood that the above description of the present invention is susceptible to various modifications, changes and adaptations, and the same are intended to be comprehended within the meaning and range of equivalents of the appended claims.

What is claimed is:

1. A glazing unit comprising, in combination: a soda-lime glass substrate having a composition such that its total energy transmittance for solar radiation is greater than that of a similarly dimensioned substrate of ordinary soda-lime glass which contains ferrous oxide, said substrate having a composition which contains iron oxide with substantially all of said iron oxide being ferric oxide, and a metal oxide coating of a composition which transmits solar radiation and at least partially reflects infrared radiation having wavelengths greater than 3μ at least partially covering at least one face of said substrate.

2. A glazing unit as defined in claim 1 wherein said coating has a reflectivity of at least 0.5 for infrared radiation having wavelengths greater than 3μ.

3. A glazing unit as defined in claim 2 wherein said substrate and coating have a total energy transmittance for solar radiation which is at least 80% of that of such a substrate of ordinary soda-lime glass.

4. A glazing unit as defined in claim 3 wherein said substrate and coating have a total energy transmittance for solar radiation which is at least as great as that of such a substrate of ordinary soda-lime glass.

5. A glazing unit as defined in claim 1 wherein the soda-lime glass in said substrate contains at least one of manganese oxide and cerium oxide.

6. A glazing unit as defined in claim 5 wherein the total weight of manganese oxide and cerium oxide is between 0.01 and 1.0% of the weight of said glass substrate.

7. A glazing unit as defined in claim 6 wherein said glass substrate contains between 0.01 and 0.5% of manganese oxide calculated in the form $MnO_2$.

8. A glazing unit as defined in claim 1 wherein said soda-lime glass substrate includes less than 0.12% by weight of ferric oxide.

9. A glazing unit as defined in claim 8 wherein said soda-lime glass substrate contains, by weight, 0.27% $MnO_2$; 0.1% $Fe_2O_3$; 0.06% $CeO_2$.

10. A glazing unit as defined in claim 1 wherein said substrate is a chemically tempered sheet.

11. A glazing unit as defined in claim 1 wherein said coating is transparent to visible light.

12. A glazing unit as defined in claim 11 wherein said coating is transparent to substantially all wavelengths within the solar radiation spectrum.

13. A glazing unit as defined in claim 1 wherein said coating contains tin oxide.

14. A glazing unit as defined in claim 1 wherein said metal oxide is a coating of lead oxide or indium oxide.

15. A glazing unit as defined in claim 1 wherein said coating contains small quantities of an ingredient selected from the group consisting of antimony oxide, arsenic oxide, cadmium oxide, tellurium oxide, fluorine ions and chlorine ions.

16. A glazing unit as defined in claim 1 wherein said coating has a thickness of between 500 A and 5,500 A.

17. A solar energy accumulator comprising at least one wall at least partly constituted by said glazing unit as defined in claim 1.

18. An arrangement as defined in claim 17 wherein said accumulator comprises a solar energy convertor, and said face of said substrate covered by said coating is directed toward said converter.

* * * * *

UNITED STATES PATENT AND TRADEMARK OFFICE
CERTIFICATE OF CORRECTION

PATENT NO. : 4,066,815
DATED : January 3, 1978
INVENTOR(S) : Jan Olink et al

It is certified that error appears in the above-identified patent and that said Letters Patent are hereby corrected as shown below:

In the heading of the patent, under [30] Foreign Application Priority Data, change "France.. 75.72932" to --Luxembourg... 72932--.

Column 1, lines 24/25, change "controlled" to --collected--.

Column 2, line 35, after "having" insert --a--.

Column 4, line 8, change "ans" to --and--; and line 34, change "bene" to --been--.

Column 8, line 56, after "this" insert --Example--; line 59, delete "Example".

Column 10, line 42, change "colllector" to --collector--.

Signed and Sealed this

Thirtieth Day of May 1978

[SEAL]

Attest:

RUTH C. MASON
Attesting Officer

LUTRELLE F. PARKER
Acting Commissioner of Patents and Trademarks